United States Patent [19]

Svensson

[11] Patent Number: 5,011,211

[45] Date of Patent: Apr. 30, 1991

[54] SUN VISOR FOR MOTOR VEHICLES

[75] Inventor: E. Gunnar Svensson, Malung, Sweden

[73] Assignee: Autopart Sweden AB, Malung, Sweden

[21] Appl. No.: 337,740

[22] Filed: Apr. 13, 1989

[30] Foreign Application Priority Data

Apr. 29, 1988 [SE] Sweden .............................. 8801630

[51] Int. Cl.⁵ .............................................. B60J 3/00
[52] U.S. Cl. .................................................. 296/97.1
[58] Field of Search ...................... 296/97.1, 97.9, 97.12

[56] References Cited

U.S. PATENT DOCUMENTS

| 2,140,959 | 12/1938 | Jacobs | 296/97.1 |
| 2,833,592 | 5/1958 | Lewis | 296/97.12 |
| 3,378,297 | 4/1968 | Ternes et al. | 296/97.9 |
| 4,598,943 | 7/1986 | Scholz et al. | 296/97.1 |
| 4,626,019 | 12/1986 | Tung et al. | 296/97.1 |

FOREIGN PATENT DOCUMENTS

| 467710 | 8/1950 | Canada | 296/97.9 |
| 500350 | 3/1954 | Canada | 296/97.12 |
| 0058742 | 9/1982 | European Pat. Off. | |
| 0144797 | 6/1985 | European Pat. Off. | |
| 2431931 | 3/1980 | France | 296/97.9 |
| 1588164 | 4/1981 | United Kingdom | 296/97.9 |
| 2115762 | 9/1983 | United Kingdom | 296/97.1 |
| 2204290 | 11/1988 | United Kingdom | 296/97.12 |

Primary Examiner—Margaret A. Focarino
Assistant Examiner—Joseph D. Pape
Attorney, Agent, or Firm—Young & Thompson

[57] ABSTRACT

Sun visor for motor vehicles consisting of an oblong plate (1) of soft material, e.g. foamed plastic, and a part (2) of hard material, e.g. moulded hard plastic. A bearing (5,6) for a main shaft (7) and a shaft carrier (12) for a second shaft (13) are moulded in one piece with the part (2), which with the aid of clips (8) which grasp a reinforcing metal wire frame (3) in the plate (1), is held fixed to the plate (1).

20 Claims, 8 Drawing Sheets

SUN VISOR FOR MOTOR VEHICLES

The present invention relates to a sun visor for motor vehicles comprising an oblong plate, a main bearing for rotatable bearing of a main shaft and a shaft holder for a second shaft, the main bearing and the holder being spaced from each other and joined to one long side of the plate.

A common current type of sun visor consists of a moulded plate of foamed plastic and the shaft holder made as separate units, which are moulded into the foamed material. When making such a sun visor, the main bearing and the shaft holder and the other components, such as a clamp spring for the main shaft and a reinforcing metal wire frame connecting the main bearing and the shaft holder, are placed and fixed relative to each other in the mould before the components are cast in foamed plastic.

Such a production method requires a relatively large amount of manual work and great accuracy to assure correct relative positions between the main bearing and the shaft holder. These must be made with fastening members to fix them to the reinforcing wire frame. The fastening members must be able to absorb a certain amount of torque from the wire without any relative rotation occurring between the wire and the main bearing o the shaft holder.

The purpose of the present invention is to achieve a sun visor of the type described by way of introduction which is so constructed that the components, primarily the main bearing and the shaft holder, can be finally fixed relative to each other outside the mould and be connected to the plate after moulding thereof in order to, on the one hand, simplify production and, on the other hand, make it possible to use one type of plate for several different variants of sun visors.

This is achieved according to the invention by virtue of the fact that the main bearing and the holder are arranged on an oblong, rigid body which is fixed to one long side of the plate and forms a smooth transition to the plate.

The invention is based on the idea that instead of making the sun visor entirely in a soft material, such as foamed plastic for example, in which the various components are cast, to let a minor part consist of a rigid material, which can serve as a carrier for several different components, not only the main bearing and the holder. This part is made so that it constitutes an integrated part of the sun visor itself.

In a further development within the scope of the invention, the rigid body is made as a carrier or part of an illumination unit carried by the sun visor, and in a further developed embodiment, the rigid body also serves as a carrier for a mirror unit.

The invention will be described in more detail below with reference to embodiments shown in the accompanying drawings, where.

Figures 1, 1A, 2:
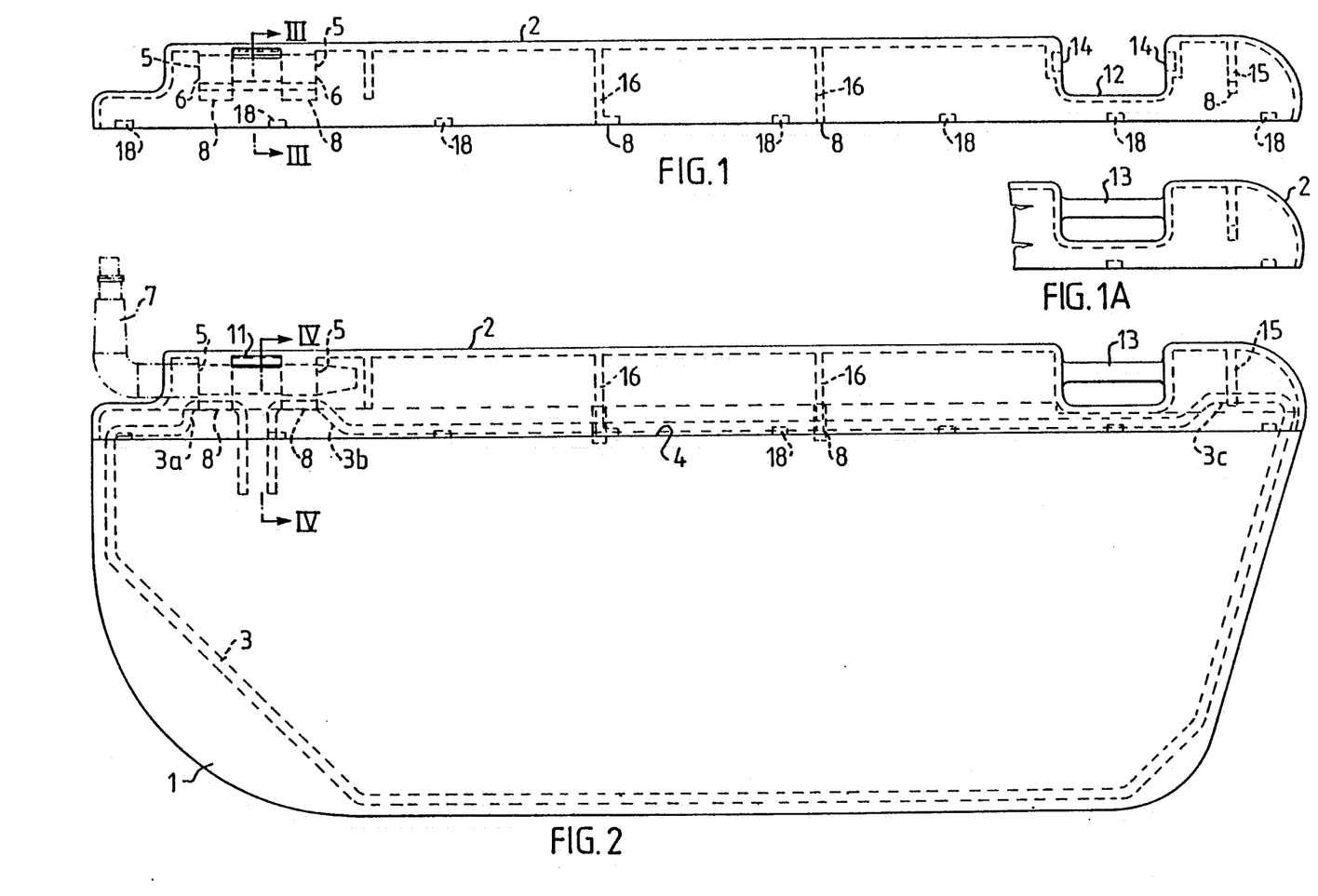
FIG. 1 shows a plan view of an upper portion of a first embodiment of a sun visor.
FIG. 1A is a portion of the piece shown in FIG. 1 in a modified embodiment.
FIG. 2 is a plan view of a complete sun visor.
Figure 3:
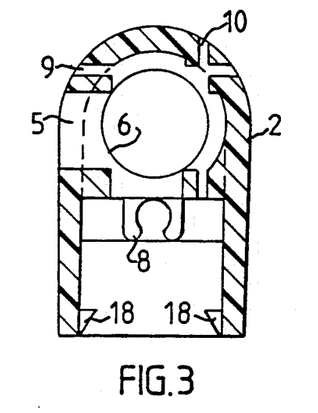
FIG. 3 is a section along the line III—III in FIG. 1.
Figure 4:
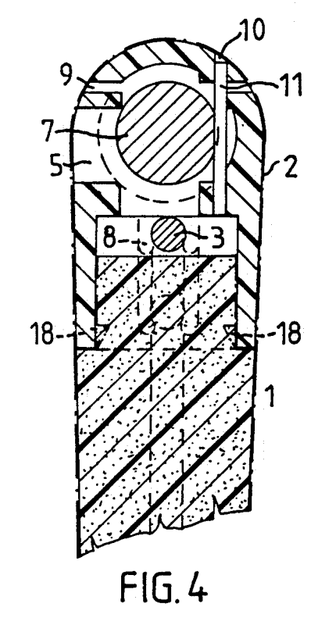
FIG. 4 is a section along the line IV—IV in FIG. 2.

In the embodiment shown in FIGS. 1, 1A, 2, 3 and 4, the sun visor consists of a plate 1 of moulded foamed plastic and an oblong, moulded plastic body 2 with a U-profile (see FIGS. 3 and 4). The foamed plastic plate 1 is reinforced in a conventional manner with a metal wire frame 3, which according to the invention in the embodiment shown in FIGS. 2-4 lies outside one long side 4 of the plate 1 and forms there three U-shaped loops 3a, 3b and 3c.

The plastic body 2 has at one end a pair of moulded flanges 5 lying within the U-profile with bores 6 forming bearings for a main shaft 7. The flanges 5 have at their lower ends clip-like projections 8. Between the flanges 5 a pair of slots 9, 10 extend perpendicular to each other, said slots being intended to fix a leaf spring 11, which presses against a flat portion of the main shaft 7 to provide a snap position in which the sun visor is held in the desired position. Depending on the placement of the flat portion of the shaft and the desired snap effect, one or the other of the slots is used for the spring 11. In the embodiment shown in FIG. 4, the spring is inserted in the slot 10.

At its opposite end, the plastic profile 2 has a U-shaped depression 12 which forms a holder for a shaft 13 (FIGS. 1A, 2), intended to be journalled in a so-called "counter-bearing". In the embodiment shown in FIG. 1, the holder 12 has a pair of opposing bores 14 for a free shaft 13. In the embodiment in FIG. 1A, the shaft 13 is cast in one piece with the profile 2. The free shaft is used when the plate 1 and the profile 2 are to be surrounded by a jacket of plastic sheeting or textile material for example. The completely moulded embodiment is used preferably when the profile 2 is to be left exposed.

The profile 2 is fixed to the plate 1 by pressing it against the side 4 of the plate so that the loops 3a, 3b of the frame 3 snap into the clip-like projections 8 (see FIG. 4), the loop 3c snaps into a corresponding clip 8 in an intermediate wall 15 and the intermediate portion of the frame 3 snaps into two clips 8 in a pair of intermediate walls 16. In order to further reinforce the connection between the profile 2 and the plate 1, the profile 2 is made at the extremities of its legs 17 with hooks 18 which when the parts are forced together extend into the soft foamed plastic material of the plate 1, as indicated in FIG. 4.

The sides of the plate 1 and the profile 2, which face each other, are of the same length and have the same width (see FIG. 4) so that an integrated unit is formed as regards shape.

Figure 4A:
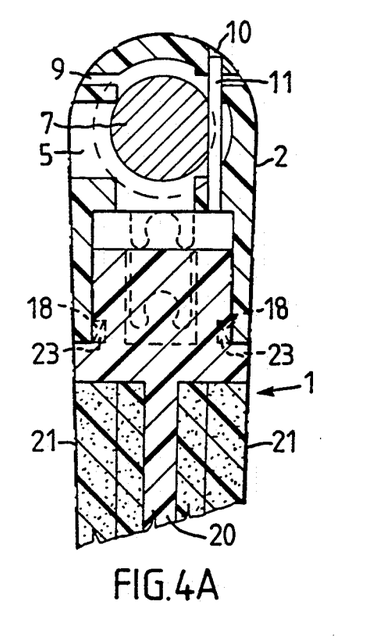
FIG. 4A is a section corresponding to FIG. 4 through a modified embodiment.

FIG. 4A shows a modified embodiment of the sun visor, which differs from the sun visor described above in that the plate 1 lacks a reinforcing metal wire frame 3 and as a reinforcing element has instead a central, rigid plate 20, of plastic for example, both sides of which have a pair of layers 21 of softer material, for example foamed plastic, which is glued on. The plate 20 has at one edge a thicker portion 22 with cavities 23 in which the hooks 18 of the profile 2 engage to fix the parts to each other. As in the preceding example, the parts are made so that an integrated unit is formed as regards shape.

Figure 5:
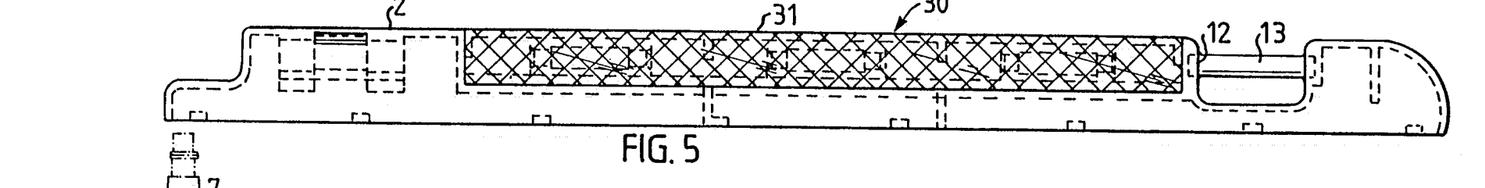
FIG. 5 is a plan view corresponding to FIG. 1 of an embodiment with an illumination unit.
Figure 6:
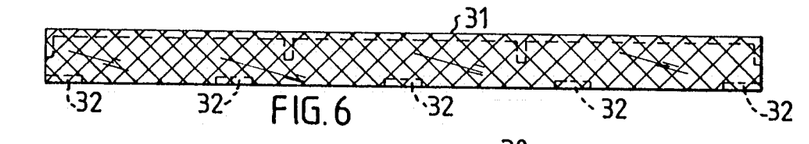
FIG. 6 is a plan view of a detail in FIG. 5.
Figure 7:
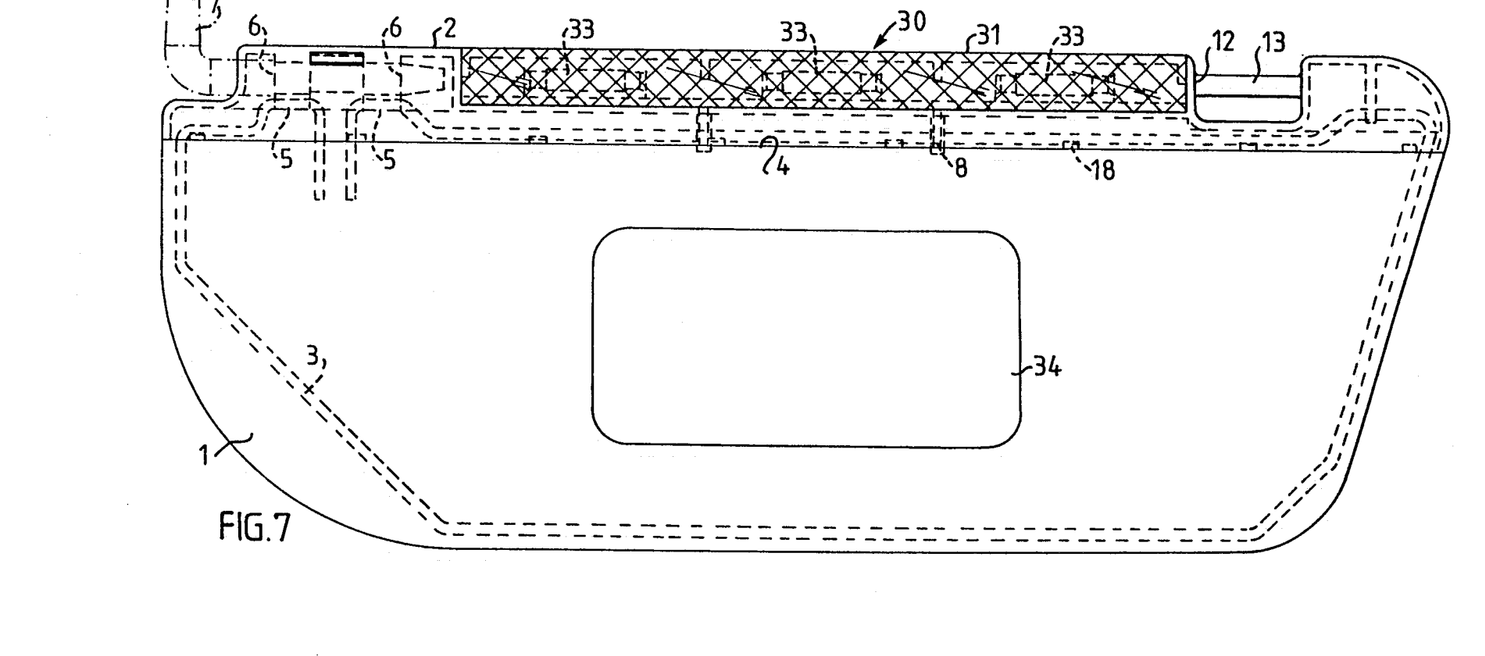
FIG. 7 is a plan view of a second embodiment of a complete sun visor.

FIGS. 5, 6 and 7 show a further development of the sun visor described above, in which a portion of the profile 2 forms an illumination unit generally designated 30. A portion of the profile 2 between the main bearing 5, 6 and the shaft holder 12 is cut out and replaced by a "lamp glass" in the form of a transparent U-profile 31 corresponding to the cut-out portion. Hooks 32 on the transparent profile 31 engage notches in the profile 2 and hold the parts together. Lamp holders inside the profile 31 hold three tube lamps 33. Alternatively, fluorescent lamps can be used. In the embodiment shown the profile 31 is symmetric with regard to the center plane of the sun visor and it spreads light uniformly forwards, backwards and upwards, when the sun visor is folded down to the vertical position. As needed, reflectors can be arranged inside the lamp glass to provide a more directed light, for example to direct the light to a person looking in the mirror 34 arranged on the sun visor. Since the illumination unit described provides a downwardly directed light when the sun visor is folded down, it can be coupled with advantage to a door switch to serve as ordinary lighting and replace conventional ceiling lighting.

Figure 8:
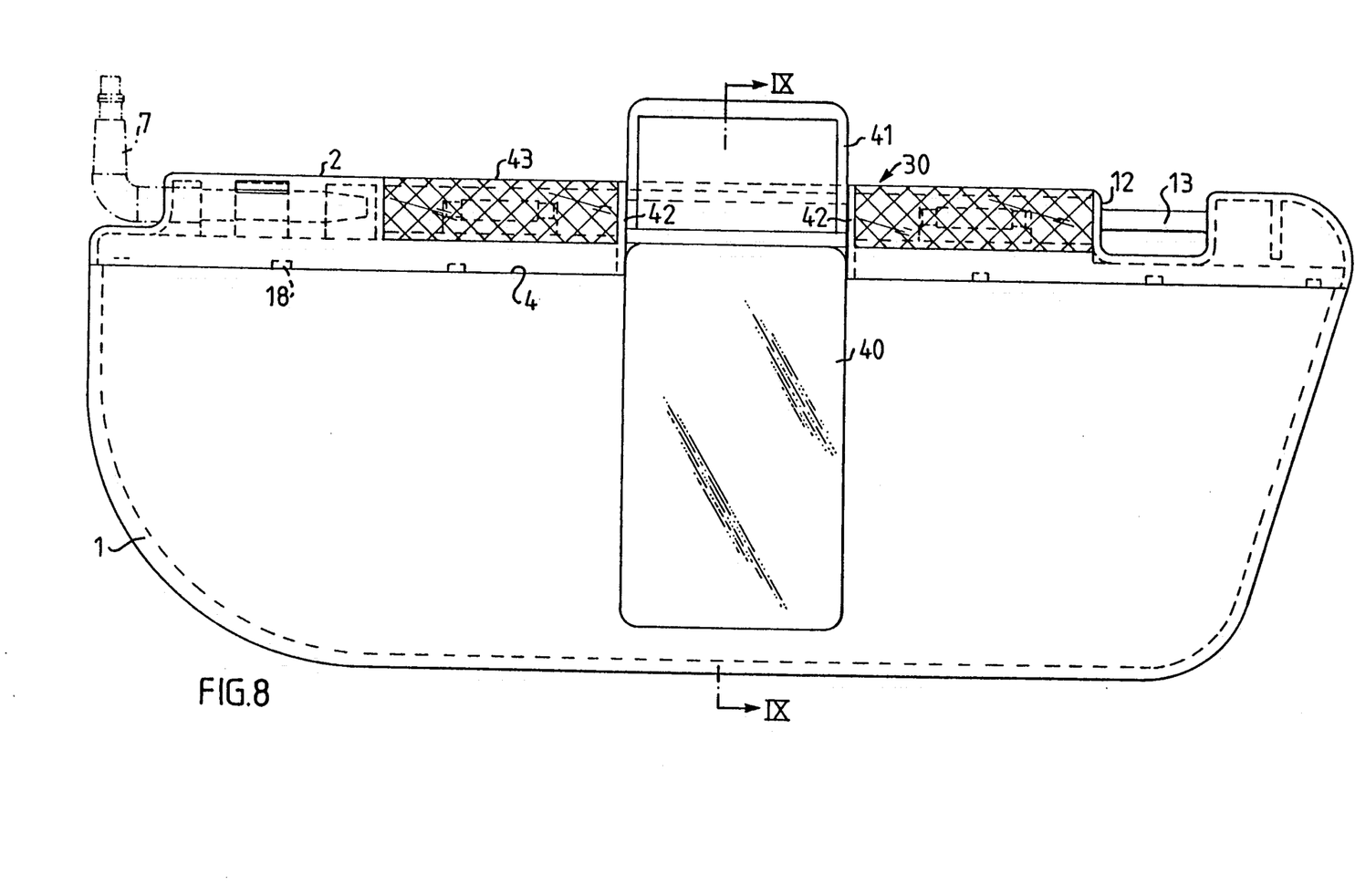
FIG. 8 is a plan view of a third embodiment of a complete sun visor.
Figure 9:
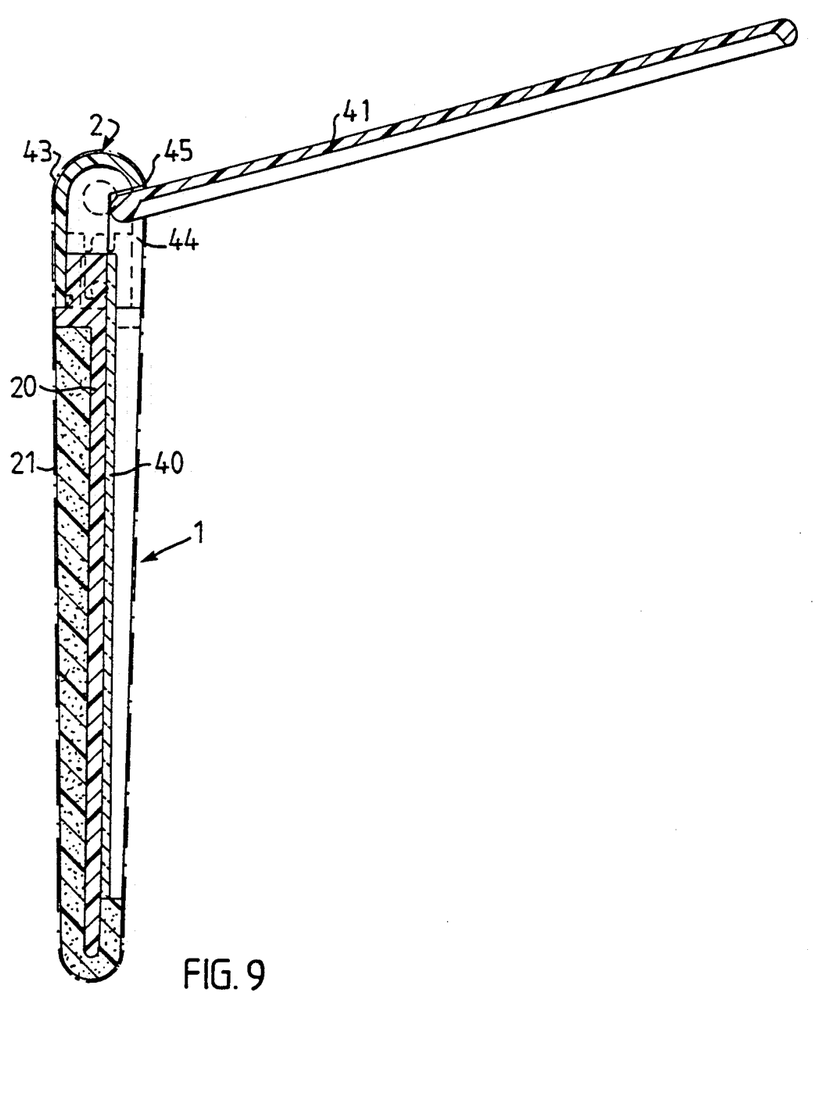
FIG. 9 is a section along the line IX—IX in FIG. 9.

FIGS. 8 and 9 show an embodiment in which the plate 1 has the construction shown in FIG. 4A with a central rigid plate 20 and with layers 21 of softer material on either side. The rearwardly directed side of the plate 20 when the sun visor is folded down, has the layer 21 removed from a central portion and a mirror 40 is glued there. A cover 41 is hinged in the plastic body 2, and in a manner, which is known per se and is not shown in more detail here, is provided with an "over-center" spring mechanism which biases the cover 41 to a position covering the mirror and to a folded-up position (see FIG. 9). The cover 41 is journalled in a pair of opposing wall portions 42 in the plastic body 2 and the "lamp glass" 43 differs from that shown in FIGS. 5-7 in that there is an opening 44 between the walls 42 for the cover 41. The upper edge 45 of the opening serves as a stop surface for the cover 41 in its folded-up position.

Figure 10:
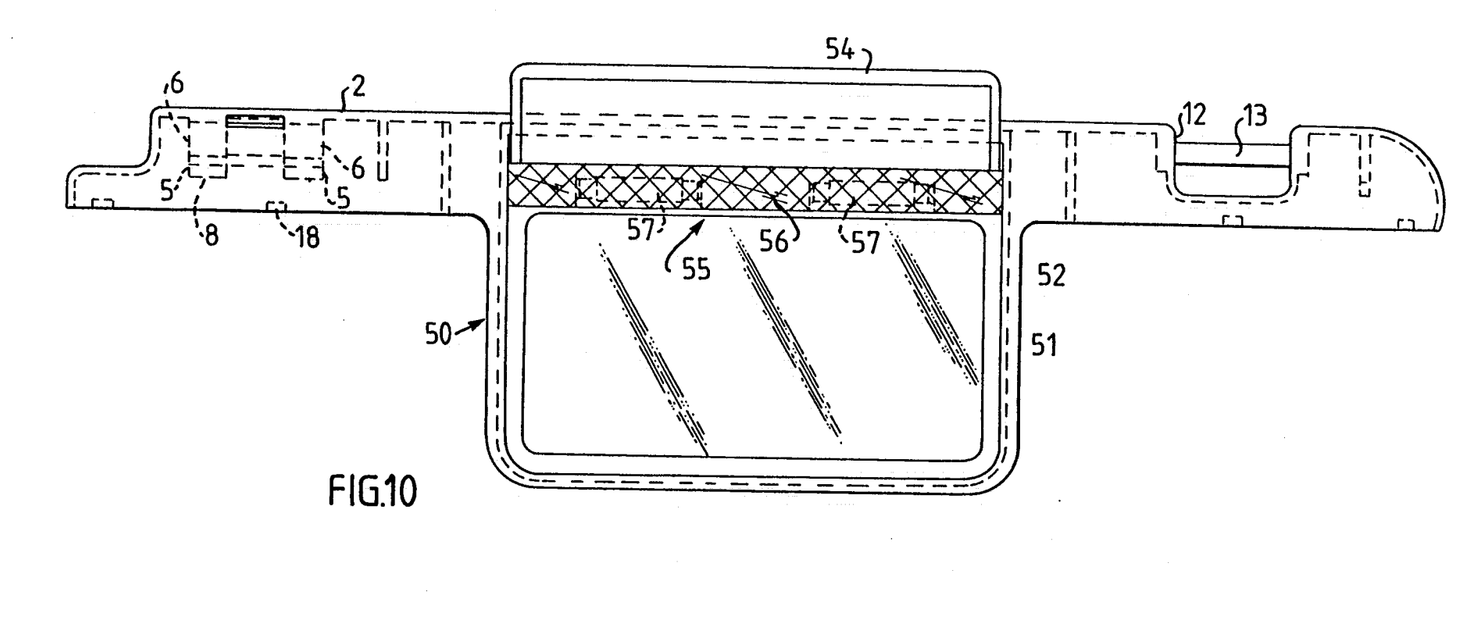
FIG. 10 is a plan view corresponding to FIG. 1 of an embodiment with an illumination and mirror unit.
Figure 11:
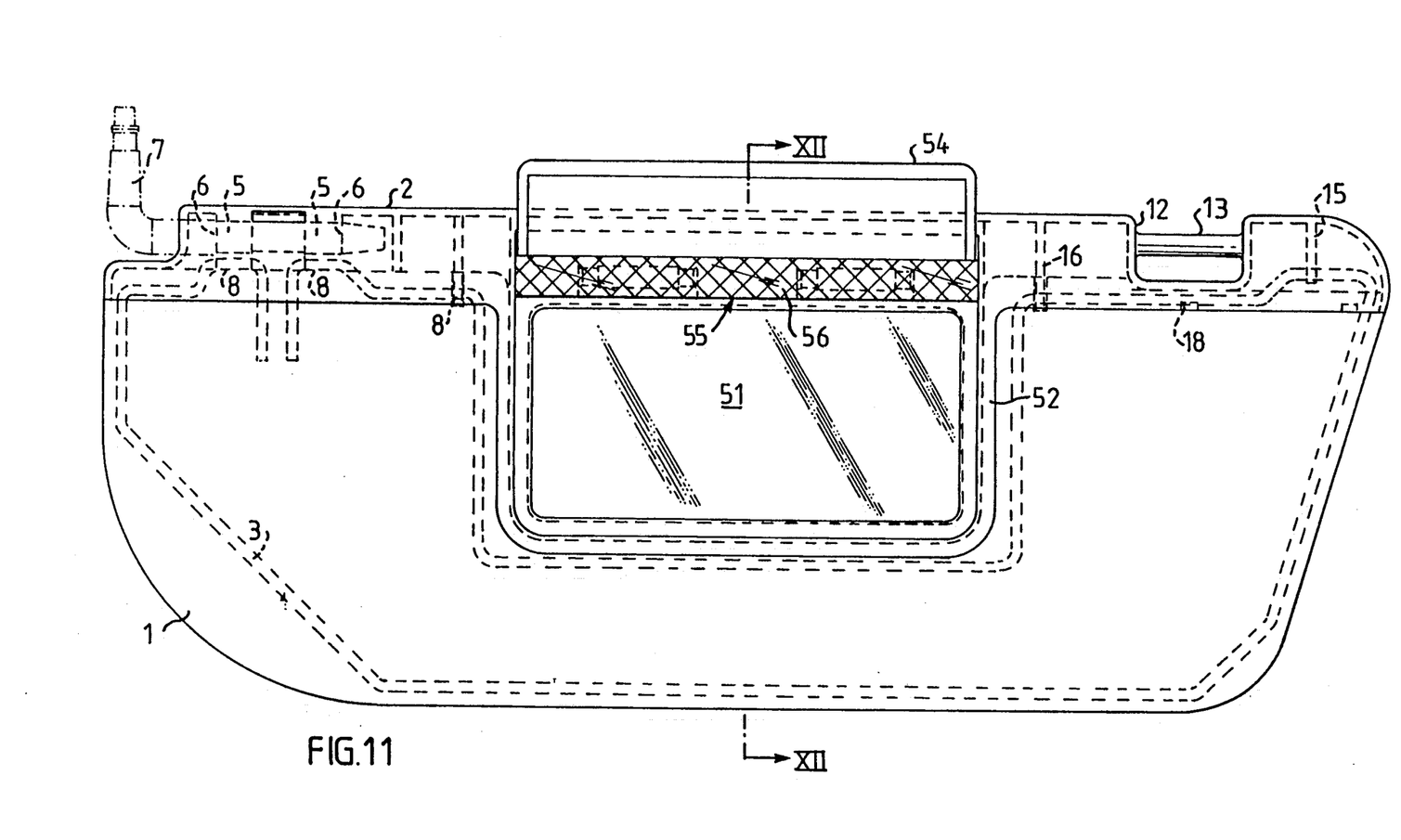
FIG. 11 is a plan view of a fourth embodiment of a complete sun visor.
Figure 12:
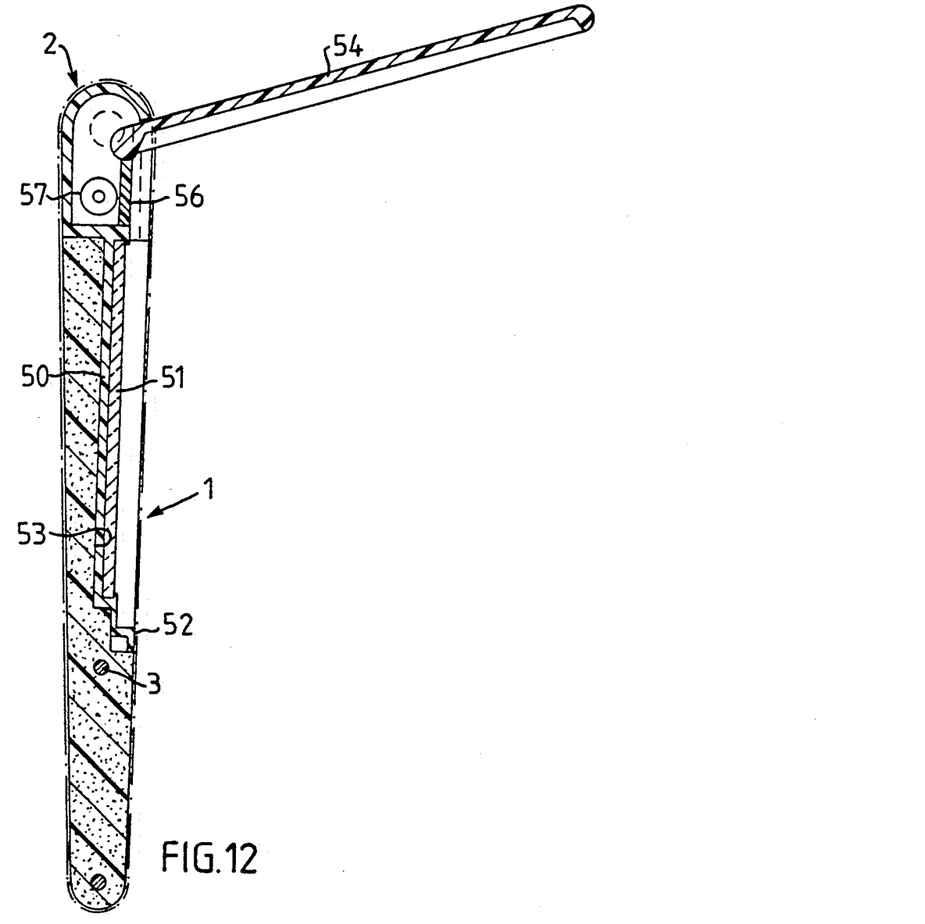
FIG. 12 is a section along the line XII—XII in FIG. 11.

FIGS. 10-12 show an embodiment which differs from that just described in that the plastic profile 2 is made to also serve as a mirror carrier. The profile 2 is moulded in one piece with a plate 50, which extends down between the main bearing 5, 6 and the shaft holder 12, and on which a mirror 51 is glued. The plate 50 is made so that a frame 52 is formed around the mirror. The frame 52 forms a smooth transition to the plate 1, as can be seen in FIG. 12. The plate 1 has a depression 53 adapted to the mirror-carrying plate 50. A cover 54 with an "over-center" spring mechanism (not shown) is hinged to the profile 2 above the mirror 51. Between the upper edges of the mirror 51 and the cover 54 there is arranged an illumination unit 55, which in the example shown differs from that described previously in that it only directs light backwards towards the person looking in the mirror. Thus, the profile 2 is provided with an opening covered by a flat transparent sheet 56. As in the embodiments described above, lamp holders with tube lamps 57 or fluorescent lights are arranged in the profile space behind the sheet 56. Switch means (not shown) cooperating with the cover close the circuit to the lamps 57 when the cover is swung up, and breaks the circuit when the cover is folded down.

In the embodiment shown in FIGS. 10-12, all the components except the plate 1 itself with its reinforcement, i.e. the wire frame 3 or the rigid plate 20, are collected in a single unit, which after simple assembly can be snapped securely to the plate 1 in order to thereby form a complete sun visor with mirror and illumination.

By, in accordance with the invention, separating all of the components except for the reinforcement from the part forming the sun visor plate itself, it is possible, as is evident from the above description, to use a single basic form of a plate, possibly with slight modifications, for the simplest models of sun visors and for more exclusive sun visor models with mirror and illumination.

The invention makes it possible to mould in a single piece of plastic the main bearing, the shaft holder (in certain cases with associated shaft), portions of an illumination unit and a mirror carrier.

I claim:

1. Sun visor for motor vehicles comprising an oblong plate (1) of soft material, a main bearing for rotatable bearing of a main shaft and a shaft holder for a second shaft, the main bearing and the holder being spaced from each other and arranged on an oblong, rigid body (2), which is rigidly fixed to one long side (4) of the plate (1) to form a smooth transition to the plate, reinforcing means embedded in the plate, and reinforcing means having, on the side (4) of the plate facing the rigid body (2), portions (3a, 3b, 3c) extending outside the plate, the rigid body having clip-like means (8) attachable to the reinforcing means (3), which are snapped over the reinforcing means to fix the rigid body to a long side of the soft plate (1).

2. Sun visor according to claim 1, characterized in that the oblong rigid body (2) extends over at least essentially the entire length of said one long side (4) of the plate (1) and that its thickness is at least essentially equal to the thickness of the plate at the transition to the plate, so that the plate and the rigid body form an integrated unit in regard to shape.

3. Sun visor according to claim 1, characterized in that the rigid body (2) is hollow, has a U-shaped cross-sectional profile and is fixed with the open end of the profile to the plate (1).

4. Sun visor according to any one of claim 1, characterized in that the main bearing (5, 6) and the holder (12) is made in one piece with the rigid body (2).

5. Sun visor according to claim 4, characterized in that the rigid body (2), the main bearing (5, 6) and the holder (12) consist of rigid plastic and are moulded in one piece with each other.

6. Sun visor according to claim 5, characterized in that the main bearing (5, 6) comprises at least one transverse wall element (5) embedded between the legs of the U-profile having a bore (6) corresponding to the cross section of the main shaft, in which element the main shaft (7) is rotatably journalled, and that the U-profile in the area of the main shaft is slotted and holds a leaf spring element (11) which extends tangentially with respect to and lies against a non-circular portion of the main shaft (7).

7. Sun visor according to claim 5, characterized in that the shaft holder (12) is made of a depression, which extends inwardly from the bottom of the U-profile of the rigid body (2) and has opposing walls between which the second shaft (13) is fixed.

8. Sun visor according to claim 6, characterized in that the plate (1) consists of a moulded foamed plastic body.

9. Sun visor according to claim 6, characterized in that the plate (1) consists of a thin central lamina (20) of rigid material with adhering laminae (21) on either side of soft material, that the central lamina has a thicker portion (22) which extends into the U-profile of the rigid body, and that the thicker portion has on its outside and the U-profile has on its inside cooperating hooks (18) and notches (23) for fixing said parts to each other.

10. Sun visor according to claim 3, characterized in that the rigid body (2) is provided on the inside of the legs of the U-profile with hooks (18) and that transverse wall elements (15, 16) are distributed along the length of the U-profile, and are made with clip-like means (8) arranged to snap over a wire frame (3) reinforcing the plate.

11. Sun visor according to claim 1, characterized in that the rigid body (2) supports an illumination unit (30, 55).

12. Sun visor according to claim 3, characterized in that a portion (31;43;56) of the U-profile of the rigid body (2) between the main bearing and the holder consists of transparent material and that lamp or fluorescent tube-holders are fixed in the hollow region of the rigid body inside the transparent part.

13. Sun visor according to claim 12, characterized in that said transparent part (31;43) is formed of a separate part removable from the rest of the rigid body (2) with a shape corresponding to the profile of the rigid body to form an integrated part in regard to shape with the rest of the rigid body.

14. Sun visor according to claim 13, characterized in that the transparent part (31;43) has a U-profile to spread the light uniformly outwards from both sides of the plate (1).

15. Sun visor according to claim 12, characterized in that the transparent part (31;43) extends over essentially the entire length of the portion of the rigid body between the main bearing (5, 6) and the shaft holder (12).

16. Sun visor according to claim 1, characterized in that one of the plate (1) and the rigid body (2) supports a mirror (34;40;50;51).

17. Sun visor according to claim 16, characterized in that the mirror unit (50, 51) comprises a mirror carrier (50) which extends out from the edge of the rigid body (2) facing the plate in the area between the main bearing and the shaft holder, and that the plate (1) is made with a depression (53) for the mirror carrier.

18. Sun visor according to claim 17, characterized in that the mirror carrier (50) is made in one piece with the rigid body (2) and comprises a frame (52) surrounding the mirror.

19. Sun visor according to claim 16, characterized in that a cover (41;54) covering the mirror is hinged in the rigid body (2).

20. Sun visor according to claim 8, characterized in that the reinforcing means (3) is a metal wire frame.

* * * * *